Patented Jan. 7, 1936

2,026,865

UNITED STATES PATENT OFFICE 2,026,865

METHOD OF PRODUCING A CELLULOSE PRODUCT

John Campbell and Robert G. Quinn, Glens Falls, N. Y., assignors to International Paper Company, New York, N. Y., a corporation of New York No Drawing. Application January 20, 1934, Serial No. 707,548

8 Claims. (Cl. 92—20)

Our present invention relates to improvements in the manufacture of cellulose and cellulosic products, and more particularly to a process for the manufacture of a non-fibrous comminuted form of cellulose suitable for use as a bulking agent in food stuffs.

In the manufacture of certain types of highly concentrated prepared foods, it is ofttimes desirable to provide a suitable bulking agent or inert compound which in itself has no food value. A specific use for these materials is in the production of starchless foods. Although many different types of bulking agents have been devised, we have found that a non-fibrous comminuted form of cellulose, formed by treating regenerated cellulose, possesses all of the desired characteristics of a bulking agent, namely, it is odorless and tasteless and does not contain gums and undesirable products of cellulose decomposition. Certain forms of impure comminuted cellulose, such as wood flour, are well known but they are obviously unsuited for use in food stuffs because of their impurities, taste and, further, they possess a tendency to agglomerate.

It is accordingly one of the many objects of our present invention to provide a process for the manufacture of a non-fibrous conminuted form of cellulose suitable for use as a bulking agent in food stuffs.

Another object of our present invention is to provide a process for treating regenerated cellulose so that the resulting product is in a non-fibrous comminuted form and is free flowing, white and tasteless.

Still another object of our present invention is to provide an improved bulking agent for food stuffs comprising a non-fibrous comminuted form of regenerated cellulose produced by treating the waste or scrap material from regenerated cellulose manufacture.

These and other objects of our present invention will become more apparent as the description of the invention proceeds.

Preferably, regenerated cellulose waste is fed to an attrition mill, hammermill or beater, and comminuted in the presence of water at from one per cent to three per cent consistency. The waste or scrap is available at plants producing regenerated cellulose in thread or sheet, or in any other form. It may be in the form of regenerated cellulose alone or it may consist of cellulose in combination with plasticizers, such as glycerine, or cellulosic materials or sludges containing other impurities.

Since the greater part of the readily obtainable waste is impure, we prefer to break up the material in water, using large volumes of water in relation to the amount of solids, so that the water soluble impurities may be washed out. Any suitable organic solvent or solvents, for example, ethyl alcohol or ether, may be employed, if necessary, to separate the water insoluble impurities. It is, of course, to be understood that the solvents employed will vary depending upon the particular impurity present in the waste material. When waste regenerated cellulose is used which contains impurities, such as pigments, they may be removed through treatment with acids or alkalies such as caustic soda or hydrochloric acid. The type and concentration of the chemicals employed in such treatments will vary dependent upon the impurity present. The dissolved substances and chemicals are removed by conventional washing methods.

Certain types of waste regenerated cellulose after chemical solvent treatment yield a product slightly off-color. For applications wherein a snow-white product is desired, the cellulose may then be bleached with chlorine or hypochlorite solution in a manner well-known in the art of preparation of bleached pulp. Only small quantities of bleach are required. From two to five per cent is usually sufficient.

Should the waste material be particularly low in impurities, it may be pulverized in a sledge or roller mill, preferably in the presence of an inert gas, such as carbon dioxide, since the greater part of the waste contains a considerable amount of impurities. The method of treatment described above will be normally used.

After the waste has been comminuted in the presence of water, the product is concentrated from the consistencey of the reduction stage, described above, to a higher consistency. This is accomplished by passing the slurry formed by the comminuting action over a decker or filter. The resulting product is then dried by any suitable means, such as spray drying and/or vacuum drying. In the drying stage of the process care must be taken to avoid the use of excessive temperature, since otherwise cellulose decomposition products may be formed, causing discoloration of the cellulose.

Although we have described the preferred steps used in forming our new bulking agent, it will be obvious to those skilled in the art that the process may be varied to meet particular problems without in any way departing from the spirit or scope of our invention as set forth in the claims appended hereto.

Having described our invention in accordance with the provisions of the patent statutes, what we claim as new is:

1. The process for the manufacture of a cellulosic bulking agent comprising the steps of comminuting regenerated cellulose scrap, treating said comminuted cellulose to remove impurities and drying the so treated cellulose at a temperature below which cellulosic decomposition products are formed.

2. The process for the manufacture of a nonfibrous comminuted form of cellulose which comprises the steps of comminuting regenerated cellulose scrap for use as a bulking agent in the presence of an inert gas, freeing said cellulose from impurities, and drying the comminuted cellulose at a temperature below which cellulose decomposition products are formed.

3. The process for the treatment of cellulose scrap comprising the steps of comminuting regenerated cellulose in the presence of water at from one per cent to three per cent consistency to remove water soluble impurities, treating said comminuted cellulose with an organic solvent to remove water insoluble impurities, and drying the regenerated cellulose at a temperature below which cellulose decomposition products are formed.

4. The process for the manufacture of a cellulose bulking agent comprising the steps of comminuting regenerated cellulose in the presence of water at from one per cent to three per cent consistency to remove water soluble impurities, treating said comminuted cellulose with ethyl alcohol to remove water insoluble impurities, and drying the regenerated cellulose at a temperature below which cellulose decomposition products are formed.

5. The process for the manufacture of a cellulosic bulking agent comprising the steps of comminuting regenerated cellulose, bleaching said regenerated cellulose, treating said comminuted cellulose to remove impurities and drying the so treated cellulose at a temperature below which cellulosic decomposition products are formed.

6. The process for the manufacture of a cellulose bulking agent comprising the steps of comminuting regenerated cellulose in the presence of water at from one per cent to three per cent consistency to remove water soluble impurities, treating said comminuted cellulose with ether to remove water insoluble impurities, and drying the regenerated cellulose at a temperature below which cellulose decomposition products are formed.

7. The process for the manufacture of a cellulose bulking agent comprising the steps of comminuting regenerated cellulose in the presence of water to remove water soluble impurities, concentrating the so-formed slurry, and drying the regenerated cellulose.

8. The process for the manufacture of nonfibrous cellulose bulking agent of high purity from regenerated cellulose which comprises reducing the cellulose to a slurry free from impurities, concentrating said slurry, and drying the cellulose.

JOHN CAMPBELL.
ROBERT G. QUINN.

DISCLAIMER 2,026,865.—*John Campbell* and *Robert G. Quinn*, Glens Falls, N. Y. METHOD OF PRODUCING A CELLULOSE PRODUCT. Patent dated January 7, 1936. Disclaimer filed April 22, 1938, by the assignee, *International Paper Company*.

Hereby enters this disclaimer to claims 1, 2, 5, and 8 of the specification of said patent.

[*Official Gazette May 24, 1938.*]